United States Patent [19]

Struss et al.

[11] Patent Number: 4,923,923

[45] Date of Patent: May 8, 1990

[54] POWDER COMPOSITIONS BASED ON POLYARYLENE SULPHIDES

[76] Inventors: Klaus Struss, Bayer Aktiengesellschaft, P.O. Box 100140, D4047 Dormagen; Christian Lindner; Karl-Erwin Piejko, both of Bayer Aktiengesellschaft, D 5090 Leverkusen, Bayerwerk, all of Fed. Rep. of Germany; Hans-Jürgen Kress, Mobay Corporation, Plastics and Rubber Division, Building 8, Mobay Rd., Pittsburgh, Pa. 15205; Dieter Wittmann, Bayer Aktiengesellschaft, P.O. Box 100140, D 4047 Dormagen, Fed. Rep. of Germany

[21] Appl. No.: 175,757

[22] Filed: Mar. 31, 1988

[30] Foreign Application Priority Data

Apr. 7, 1987 [DE] Fed. Rep. of Germany ....... 3711623
May 9, 1987 [DE] Fed. Rep. of Germany ....... 3715543

[51] Int. Cl.$^5$ .................. C08L 51/04; C08L 81/04
[52] U.S. Cl. ............................... 525/64; 525/189; 525/934
[58] Field of Search .................. 525/64, 189, 934

[56] References Cited

U.S. PATENT DOCUMENTS

| | | | |
|---|---|---|---|
| 3,856,738 | 12/1974 | Tieszen et al. | 525/189 |
| 4,090,993 | 5/1978 | Attwood et al. | 524/508 |
| 4,113,796 | 9/1978 | Bischoff et al. | |
| 4,139,576 | 2/1979 | Yoshimura et al. | 525/189 |
| 4,177,320 | 12/1979 | Yoshimura et al. | 428/422 |
| 4,212,923 | 7/1980 | Brady | 525/189 |
| 4,247,598 | 1/1981 | Blackwell | 524/543 |
| 4,355,059 | 10/1982 | Blackwell | 525/189 |
| 4,421,588 | 12/1983 | Davies | 525/934 |
| 4,451,607 | 5/1984 | Garcia et al. | |
| 4,476,284 | 10/1984 | Cleary | |
| 4,522,964 | 6/1985 | Lindner et al. | 525/934 |
| 4,581,411 | 4/1986 | Liang et al. | 525/189 |
| 4,749,752 | 6/1988 | Youhi et al. | 524/508 |

FOREIGN PATENT DOCUMENTS 0103869 3/1984 European Pat. Off. .
0142825 5/1985 European Pat. Off. .

*Primary Examiner*—John C. Bleutge
*Assistant Examiner*—David W. Woodward

[57] ABSTRACT

The invention relates to powder compositions based on polyarylene sulphides, in particular polyphenylene sulphides (PPS) and thermoplastic vinyl polymers and to their use for the preparation of thermoplastic moulding compounds.

7 Claims, No Drawings

POWDER COMPOSITIONS BASED ON POLYARYLENE SULPHIDES

This invention relates to powder compositions based on polyarylene sulphides, in particular polyphenylene sulphides (PPS) and thermoplastic vinyl polymers and to their use for the preparation of thermoplastic moulding compounds.

Polyarylene sulphides are thermally stable and articles produced from them are capable of withstanding mechanical stresses. Combining or mixing polyarylene sulphides with other polymers, e.g. vinyl polymers, by conventional methods of melt compounding is problematical and can only be carried out to a limited extent. With conventional compounding processes it is difficult to obtain a predetermined degree of dispersion of the components which are to be mixed with polyarylene sulphides but dispersion is important for obtaining suitable properties for technical application in thermoplastic moulding compounds.

It has now been found that powder compositions of polyarylene sulphides and vinyl polymers can be worked up thermoplastically if the mixture is prepared in a dispersing agent and precipitated by coagulation.

The present invention therefore relates to powder compositions containing at least one thermoplastic vinyl polymer and at least one polyarylene sulphide, prepared by mixing dispersions in a dispersion medium of a thermoplastic vinyl polymer and a polyarylene sulphide and coagulating the resulting mixture and subsequently separating the resulting coagulate from the dispersion medium and working it up to a powder.

The invention also relates to the use of the powders obtained by the preparation of thermoplastic moulding compounds.

Water may be used as dispersion medium or organic media may be used, such as alcohols, esters, ketones, ethers, amines, lactones, lactams, amides, hydrocarbons, halogenated hydrocarbons, etc. or mixtures of these media. Water is the preferred medium.

The vinyl polymer dispersions suitable for the present invention are known. They may consist of conventional polymer dispersions obtained by emulsion or dispersion polymerisation or they may be obtained by dispersion of a previously prepared polymer. The vinyl polymers may be partially cross-linked.

The vinyl monomer polymers used may be based on olefinically unsaturated monomers such as styrene or α-methyl styrene optionally substituted with $C_1$ to $C_8$ alkyl and/or with a halogen such as F, Cl or Br on the aromatic ring; or acrylonitrile, methacrylonitrile, esters of acrylic or methacrylic acid with primary and/or secondary and/or tertiary $C_1$ to $C_{15}$ alcohols, vinyl esters of $C_1$ to $C_{15}$ carboxylic acids, maleic acid anhydrides, N-substituted maleimides, vinyl chloride, vinylidene chloride or fluoride and/or thermoplastic graft polymers of the above mentioned monomers on a graft basis of a rubber having a glass transition temperature below 0° C., in particular below −10° C., preferably graft polymers having rubber contents of from 3 to 85% by weight, in particular from 10 to 70% by weight.

Polymers of styrene, alkyl methacrylate or α-methyl styrene optionally containing comonomers such as acrylonitrile, N-substituted maleimide, alkylacrylate or vinyl acetate are preferred.

Particularly preferred polymers are copolymers of styrene and/or α-methyl styrene with from 0.01 to 40% by weight of acrylonitrile incorporated by polymerisation or with 0 to 60% by weight of incorporated methyl methacrylate, polystyrene or polymethyl methacrylate.

Particularly suitable thermoplastic vinyl monomer polymers in the context of the present invention are graft polymers of vinyl monomers (homo or interpolymers of monomers selected from styrene, α-methyl styrene, acrylonitrile, methacrylonitrile, vinyl acetate, alkyl methacrylate and alkyl acrylate) on rubbers which are preferably partly cross-linked, particulate rubbers selected from diene polymers (polybutadiene, polyisoprene and their copolymers with from 0.01 to 40% by weight of styrene, acrylonitrile or alkyl(meth)acrylate), acrylate rubbers (polyalkyl acrylates, in particular poly-n-butyl, -ethyl and -ethylhexyl acrylate) which may contain small quantities of incorporated comonomers such as butadiene, vinyl ethers, acrylonitrile, styrene or cross-linking comonomers from the series of polyfunctional vinyl or alkyl monomers; also polyolefine rubbers such as polyethylene, EPDM rubber and silicone rubber in a particulate, partially cross-linked form.

Graft acrylate rubbers and silicone graft rubbers are particularly suitable, especially silicone graft rubbers having silicone contents of from 50 to 95% by weight, in particular from 70 to 90% by weight.

Methods of preparing the polyarylene sulphide suitable for the purpose of this invention are known (e.g. US-PS 3 354 129).

For the preparation of polyarylene sulphide compositions suitable for this invention it is preferred to use only slightly branched and specially unbranched polyarylene sulphide.

The polyarylene sulphides preferably have a melt viscosity (Pas) determined at 306° C. of up to $10^4$, preferably up to $10^3$, most preferably up to 10, in particular up to 1 Pas at a shearing stress of $T=10^2$ Pa.

The melt viscosity (Pas) at 306° C. and at a shearing stress of $T=10^2$ Pa was determined by means of a Rheometer Model 3250 of Instron.

To prepare the polyarylene sulphide dispersion suitable for the purpose of this invention, the polyarylene sulphide obtained in the process of preparation is first freed from the reaction solution and from unreacted organic and inorganic constituents by the usual methods (e.g. DE-OS 3 339 233).

The morphology and particle size of the polyarylene sulphide powder may be influenced, for example, by the method employed for working up the reaction solution.

The dispersion medium used for preparing the polyarylene sulphide dispersions suitable for this invention may be water or organic media such as alcohols, esters, ketones, ethers, amines, lactones, lactams, hydrocarbons, halogenated hydrocarbons and mixtures of these media. Water is the preferred medium.

The polyarylene sulphide dispersions suitable for the purpose of this invention may be prepared either from a polyarylene sulphide powder which is still moist with solvent used for its preparation or from a polyarylene sulfphide powder which has already been dried but aqueous polyarylene sulphide dispersions, which are preferred for this invention, are advantageously prepared from moist polyarylene sulphide powders.

Any known processes for the production of dispersions may in principle be used for preparing the polyarylene sulphide dispersion and the vinyl polymer dispersion. Vibratory processes may be employed, e.g. those using ultrasound. The dispersions are preferably prepared with the aid of a stirrer, preferably a high vibration stirrer, optionally under pressure and at temperatures of from 0° to 150° C., preferably from 5° to 90° C., especially from 10° to 60° C. Preferred polyarylene sulphide dispersions have a solids content (polyarylene sulphide content) of from 10 to 60% by weight, in particular from 15 to 40% by weight.

Surface active auxiliary substances may be used for the preparation of the dispersions, e.g. known nonionic emulsifiers (e.g. US-P 4 548 977), but the dispersions are preferably prepared without auxiliary substances.

One process which is particularly suitable for the preparation of the dispersions of polyarylene sulphide starts with polyarylene sulphide powder which is moist with water. This moist polyarylene sulphide powder which has been obtained, for example, by squeezing off the water or by filtration, optionally under pressure, is converted into a paste-like polyarylene sulphide dispersion by means of a high speed stirrer, optionally with the addition of water.

For preparing a polyarylene sulphide dispersion suitable for the invention from polyarylene sulphide powder which has already been dried, it is advantageous to treat the powder with an organic medium, e.g. alcohol, and subsequently to displace the organic medium with water. The resulting polyarylene sulphide powder which is now moist with water may be worked up into a dispersion by the process described above. For producing powder compositions according to the invention, the polyarylene sulphide dispersion is vigorously mixed with the dispersion of thermoplastic vinyl polymer, preferably by stirring, preferably at room temperature although elevated temperatures, up to 100° C., may be advantageous in special cases. Other components are optionally added, e.g. phenolic antioxidants. An additional quantity of dispersing medium may be advantageous in some cases.

The dispersion mixture obtained after mixing may be freed from the dispersion medium by known methods, e.g. spray drying. The dispersion is preferably coagulated to a pulverulent polymer mixture at temperatures of 20° to 120° C. Coagulation may be carried out e.g. by the addition of acids, bases, salts, etc. and is preferably carried out at temperatures of from 20° to 100° C. The pulverulent polymer mixture obtained is dried at temperatures of from 40° to 150° C.

The powders according to the present invention have an average particle size ($d_{50}$ value) of from 1 to 10,000 $\mu$m, preferably from 10 to 8000 $\mu$m, most preferably from 50 to 5000 $\mu$m. They contain the polyarylene sulphide in a highly disperse form (particle form) in which they existed in the polyarylene sulphide dispersion used for the preparation of the composition.

Preferred powder compositions contain from 1 to 99% by weight, preferably from 5 to 60% by weight, most preferably from 10 to 40% by weight of polyarylene sulphide and from 99 to 1% by weight, preferably from 95 to 40% by weight, most preferably from 90 to 60% by weight of vinyl monomer polymer.

The invention further relates to the use of the powder compositions according to the invention as additives for thermoplastic moulding compounds to improve their use properties. They are added in quantities of from 0.5 to 50% by weight, preferably from 1 to 20% by weight, based on the metal quantity of moulding compound.

The addition of these compositions result in a considerable improvement of various properties of the moulding compounds. Thus they act, for example, as antidripping agents in the event of the moulded products catching fire. Other properties which are improved are, for example, the release from the mould, the impact strength and the dimensional stability under heat.

The powder compositions are suitable for use as additives to thermoplasts such as ABS, ASA, PVC, polycarbonates, polyalkylene carboxylic acids, etc.

EXAMPLES

I. Preparation of a polyphenylene sulphide suitable for the preparation of the powder composition.

1673 parts by weight of $Na_2S \cdot 7$–$9\ H_2O$, 318 parts by weight of LiCl and 3054 parts by weight of N-methylpyrrolidone are introduced into a reaction vessel equipped with stirrer and distillation attachment and the mixture is heated to 200° C. At least 2600 parts by weight of volatile components distill off in the process. 1102.5 parts by weight of 1,4-dichlorobenzene dissolved in 453 parts by weight of N-methylpyrrolidone are then added and the reaction mixture is boiled under reflux for 7 hours (reflux temperature 180° to 195° C.). After completion of the reaction, the reaction mixture is washed, first with ethanol and then with water.

Yield: 502 parts by weight.

II. Dispersions of vinyl monomer polymers put into the process.

II. (1) ABS graft polymer dispersion having a polymer solids content of 34% by weight and containing water as dispersion medium. The dispersion was prepared by radical emulsion graft polymerisation of a mixture of styrene and acrylonitrile on a polybutadiene latex. The dispersed acrylonitrile-butadiene-styrene (ABS) graft polymer is composed of 50% by weight of coarse particled cross-linked polybutadiene with an average particle size ($d_{50}$) of 0.4 $\mu$m and 50% by weight of styrene-acrylonitrile copolymer containing 28% by weight of acrylonitrile and 72% by weight of styrene.

II. (2) PMMA dispersion having a polymer solids content of 34% by weight and containing water as dispersion medium. The dispersion was prepared by radical emulsion polymerisation of methyl methacrylate. The polymethyl methacrylate (PMMA) has a Staudinger index ($\eta$) determined in dimethyl formamide of 0.65 dl/g.

II. (3) ASA* dispersion having a polymer solids content of 34% by weight with water as dispersion medium. The dispersion was prepared by radical emulsion graft polymerisation of a styrene-acrylonitrile mixture on the emulsion of a partially cross-linked n-butyl acrylate polymer rubber cross-linked by the incorporation of triallyl cyanurate. The dispersed graft polymer consists of 60% by weight of finely divided acrylate rubber with an average particle size ($d_{50}$) of 0.16 $\mu$m and 40% by weight of styrene-acrylonitrile copolymer composed of 28% by weight of acrylonitrile and 72% by weight of styrene.

*ASA=acrylate rubber/styrene/acrylonitrile copolymer.

III. Preparation of the powder compositions according to the invention.

Water is added to the moist polyphenylene sulphide powder according to I in such a quantity that an 18% by weight slurry, based on the polyphenylene sulphide, is formed. A dispersion is prepared within 15 minutes by stirring with a high speed stirrer at the rate of 1000 revs. per min.

2400 parts by weight of this aqueous disperions are introduced with stirring into 3000 parts by weight of a dispersion according to II. The resulting dispersion mixture is stirred for 1 hour and stabilised with phenolic antioxidant. The dispersion mixture is then stabilised by the addition of antioxidants. The dispersion mixture obtained is introduced into an aqueous solution of $MgSO_4$ and acetic acid at 70° to 80° C. and stirred for 20 minutes at 90° to 100° C. The substance is then cooled, filtered and washed until the wash water is almost free from electrolyte. The isolated moist product is dried at 70° to 80° C.

Yield: 1450 parts by weight.

The following powder compositions (III.1), (III.2) and (III.3), which all contain about 30% by weight of polyphenylene sulphide, are prepared from dispersions (II.1), (II.2) and (II.3).

The powders may be worked up, for example, to form moulded products or they may be mixed with vinyl monomer thermoplasts such as ABS, polystyrene, ASA or polymethyl methacrylate. The moulded products then obtained are free from any surface defects whereas comparison moulding compounds prepared on the basis of a conventional PPS (polyphenylene sulphide) gives rise to non-uniform moulded products with streaky surfaces and unsatisfactory mechanical properties.

IV. Preparation and properties of a moulding compound with antidrip properties, using a powder composition according to the invention.

A. Straight chained polycarbonate based on bisphenol A, having a relative solution viscosity $\eta_{rel}$ of from 1.26 to 1.28 determined in $CH_2Cl_2$ at 25° C. and at a concentration of 0.5 g/100 ml.

B. Styrene/acrylonitrile copolymer with a styrene/acrylonitrile ratio of 72:28 and a limiting viscosity number of $(\eta)=0.55$ dl/g (determination in dimethyl formamide at 20° C.).

C. Triphenyl phosphate.

D. SAN graft polymer of a 50% by weight styrene-acrylonitrile mixture (in proportions of 72:28) on 50% by weight of a particulate polybutadiene having an average particle size ($d_{50}$) of 0.4 μm, obtained by radical emulsion polymerisation.

E. Coprecipitation product of 90 parts by weight of D and 10 parts by weight of PPS, prepared by a method analogous to that of Example III but using different proportions of components.

Preparation of the moulding compounds according to the invention.

Compounding of components A, B, C, D and E was carried out in a 3 liter internal kneader at temperatures of from 200° to 220° C.

Moulded articles measuring 127×12.7×1.6 mm were produced in an injection moulding machine at 260° C.

The moulded products obtained from the moulding compounds according to the invention were light in colour and showed no surface irregularities.

To assess the dripping characteristics on exposure to flames, the samples were made up into rods measuring 127×12.7×1.6 mm and tested in a test arrangement according to UL-subj. 94 V. In this test, the rods are mounted vertically with the underside of the sample situated 305 mm above a strip of bandaging material. Each test rod is ignited separately by two successive ignition processes 10 seconds in duration. The dripping characteristics are observed after each ignition process and the sample is assessed accordingly. A Bunsen burner burning with a blue flame of natural gas 10 mm (3.8 inches) in height with a thermal output of $3.73 \times 10^4$ $kJm^3$ (1000 BUT per cubic foot) is used for igniting the samples.

As may be seen from the following table, the moulding compounds according to the invention do not discharge burning drips in the test arrangement described above.

TABLE

Composition and properties of the moulding compounds.

| Example | A | B | C | D | E | Dripping Characteristics according to UL 94 V |
|---|---|---|---|---|---|---|
| | | (parts by weight) | | | | |
| 1[(1)] | 60 | 16 | 8 | 24 | | Discharge of burning drips |
| 2 | 60 | 16 | 8 | 12 | 12 | Does not drip |

[(1)]Comparison Example.

We claim:

1. Process for the preparation of a powder composition of at least one thermoplastic polymer of vinyl monomers and a polyarylene sulphide wherein (a) a dispersion of a polyarylene sulphide is mixed with a dispersion of a thermoplastic polymer of vinyl monomers, (b) the resulting mixture is subjected to coagulation, and (c) the coagulate obtained is separated from the liquid phase and worked up into a powder.

2. The process according to claim 1 wherein the dispersion of polyarylene sulfide is an aqueous dispersion.

3. The process according to claim 1 wherein the dispersion of a thermoplastic polymer of vinyl monomers is an aqueous dispersion.

4. The process according to claim 1 wherein the thermoplastic polymer is a graft polymer of styrene and acrylonitrile on a polybutadiene substrate.

5. The process according to claim 1 wherein the thermoplastic polymer is polymethyl methacrylate.

6. The process according to claim 1 wherein the thermoplastic polymer is a copolymer of acrylate rubber, styrene and acrylonitrile.

7. The process according to claim 1 wherein the polyarylene sulfide is substantially unbranched.

* * * * *